United States Patent
Mondal

(10) Patent No.: US 6,825,846 B2
(45) Date of Patent: Nov. 30, 2004

(54) SYSTEMS AND METHODS FOR CAPTURING SCREEN DISPLAYS FROM A HOST COMPUTING SYSTEM FOR DISPLAY AT A REMOTE TERMINAL

(75) Inventor: Umasankar Mondal, Snellville, GA (US)

(73) Assignee: American Megatrends, Inc., Norcross, GA (US)

( * ) Notice: Subject to any disclaimer, the term of this patent is extended or adjusted under 35 U.S.C. 154(b) by 147 days.

(21) Appl. No.: 10/016,484

(22) Filed: Dec. 10, 2001

(65) Prior Publication Data

US 2003/0110244 A1 Jun. 12, 2003

(51) Int. Cl.[7] ................................................ G09G 5/36
(52) U.S. Cl. ..................................... 345/547; 345/2.1
(58) Field of Search ................................. 345/545, 533, 345/534, 1.1, 2.1–2.3, 501, 530, 531, 547

(56) References Cited

U.S. PATENT DOCUMENTS

| | | | | |
|---|---|---|---|---|
| 5,732,212 A | * | 3/1998 | Perholtz et al. | 709/224 |
| 5,777,874 A | * | 7/1998 | Flood et al. | 700/82 |
| 5,990,852 A | | 11/1999 | Szamrej | 345/2.1 |
| 6,065,072 A | * | 5/2000 | Flath | 710/29 |
| 6,219,695 B1 | | 4/2001 | Guttag et al. | 709/217 |
| 6,272,562 B1 | * | 8/2001 | Scott et al. | 710/16 |
| 6,304,895 B1 | * | 10/2001 | Schneider et al. | 709/203 |
| 6,378,014 B1 | | 4/2002 | Shirley | 710/100 |
| 6,476,854 B1 | | 11/2002 | Emerson et al. | 348/143 |
| 6,560,641 B1 | | 5/2003 | Powderly et al. | 709/219 |
| 6,609,034 B1 | | 8/2003 | Behrens et al. | 700/19 |
| 6,636,929 B1 | | 10/2003 | Franz et al. | 710/313 |
| 6,651,190 B1 | * | 11/2003 | Worley et al. | 714/43 |
| 6,664,969 B1 | | 12/2003 | Emerson et al. | 345/544 |
| 6,681,250 B1 | | 1/2004 | Thomas et al. | 709/226 |
| 2002/0040418 A1 | * | 4/2002 | Bress et al. | 711/112 |
| 2002/0097234 A1 | * | 7/2002 | Sauber | 345/204 |
| 2002/0194403 A1 | * | 12/2002 | Pua et al. | 710/62 |

OTHER PUBLICATIONS

U.S. Official Action dated Feb. 23, 2004 in U.S. Ser. No. 10/247,876.
U.S. patent application No. 10/247,876, filed Sep. 20, 2002, entitled "Systems and Methods for Establishing Interactions Between a Local Computer and a Remote Computer." Inventor: Clas Gerhard Sivertsen.
U.S. patent aplpicaiton No. 10/790,160, filed Mar. 1, 2004, entitled "Method, System, and Apparatus for Communicating with a Computer Management Device." Inventor; Subash Kalbarga.

* cited by examiner

*Primary Examiner*—Kee M. Tung
(74) *Attorney, Agent, or Firm*—Merchant & Gould

(57) ABSTRACT

The present invention provides systems and methods for monitoring a host computing system from a maintenance computing system located at a remote location. The system of the present invention includes a frame grabber that is connected the digital output of a video controller associated with the host computing system and collects sets of data output in digital form from the video controller independent of an analog to digital converter. Each collected digital data set represents a frame of data displayed on a terminal of the host computing system by the video controller and is stored in a storage device associated with the frame grabber. Successive sets of data are also compared to each other, and the differences between the data are also stored in the storage device. During a maintenance session, a first data set representing the data currently displayed on the terminal of the host computing system is transmitted to the maintenance computing system, and thereafter, only changes between successive data sets are transmitted to update the maintenance computing system.

38 Claims, 8 Drawing Sheets

SYSTEMS AND METHODS FOR CAPTURING SCREEN DISPLAYS FROM A HOST COMPUTING SYSTEM FOR DISPLAY AT A REMOTE TERMINAL

FIELD OF THE INVENTION

The present invention relates in general to systems and methods used for emulation on a remote terminal of information displayed on a host computing system, and more particularly to a terminal emulation system and method that uses a hardware interface with the host computing system for capture of displayed information, capture of information concerning host computing system health information, and control of keyboard, mouse, and drives of the host computing system.

BACKGROUND OF THE INVENTION

In recent years there has been a significant increase in reliance on computing systems to aid workers in performance of their assigned task. In fact, it is not uncommon for most, if not all, employees of a company or other organization to have access to some type of computing system. To increase productivity and sharing of system resources, many companies have further introduced computer networks linking all of the computing systems of the company together, thereby allowing for internal communication in the company and the sharing of files and other information between different computing systems. Many of these networks are not limited to one physical location, but instead, may link computing systems together that are located at many different geographic locations, such as the different offices of a company. Further, many of these networks allow users access via a telephone line or other data communication link, no matter where the computing system is located, such as in the case of an employee who is traveling with a laptop.

FIG. 1 illustrates a common network system 10. In general, network systems typically include a network 12, such as a Transmission Control Protocol/Internet Protocol (TCP/IP) network or other similar network system. Connected to the network is a plurality of host computing systems, 14a–14n, representing the individual computing systems used throughout the company or organization. The network system may also include one or several file servers 16 connected to the network 12 for storing and allowing access to shared files and resources. The network system 10 may also include web servers 18 for connecting the computing systems to the Internet. Other server systems 20 may also be present.

An important problem with computer networking is the ability to provide management and maintenance to each of the host computing systems and servers connected to the network. As stated, the computing systems and servers may be located at various locations throughout a company or organization, some of which may be in different geographic locations. As such, it is typically not feasible to provide maintenance and servicing of a particular computing system or server by going to the physical location of the computer or server. Further, providing maintenance information to the user of the computing system over the telephone is also not typically advantageous, as many computing system users are not as knowledgeable concerning computing system configuration and maintenance.

For this reason, management systems have been developed that allow network maintenance personnel, from a central location, to maintain computing systems and servers connected to a network. Specifically, with reference to FIG. 1, many network systems also include either one or several maintenance computing systems 22 connected to the network. The maintenance computing system, sometimes referred to as the client computing system, is capable of communicating with other host computing systems and servers in the network. The maintenance computing system monitors the health of the hardware of the host computing systems and also the information output to the display of the host computing systems. If a particular computing system or server is indicated to have errors, the maintenance computing system can access the health parameters associated with the host computing system or server and can also receive copies of the data output to the display of the host computing system or server. The data displayed on the host computing system is also displayed on the maintenance computing system, so that the maintenance personal can view errors and other diagnostic information typically displayed by the host computing system to its own terminal. In other words, the maintenance computing system acts as a terminal emulator emulating the data displayed on the display of the host computing system.

There are currently several terminal emulation systems commercially available for centralized maintenance of computing systems. These conventional systems mainly fall into two categories; software-based and software/hardware hybrid systems. While both types of systems allow maintenance personnel to perform maintenance, upgrades reconfiguration, etc. of host computing systems and servers from a remote location, there are some drawbacks to these conventional systems.

Specifically, as mentioned, some maintenance systems and servers are software based. One commercially available software-based maintenance system is PC Anywhere® developed and distributed by Symantec Corporation located in Cupertino, Calif. This software-based system is described more fully with reference to FIG. 2A. In particular, FIG. 2a illustrates portions of the network system 10 of FIG. 1, including a representative host computing system 14 the network 12, and a maintenance computing system 22. It is understood that the host computing system could be a server. The representative host computing system includes a CPU 24. Connected to the CPU 24 is a first bus bridge typically referred to as a north bridge 26. The north bridge connects a local bus to the CPU, where the bus among other things provides a communication link between the CPU and a memory controller 28 and a memory system 30. The host computing system 14 also includes a second bridge, typical referred to as a south bridge 32. The south bridge links various buses 34a–34n to the CPU. For example, an industrial standard architecture (ISA) bus may be connected to the south bridge and a bus connecting the CPU to a keyboard controller 36 may also be present on one of the buses of the south bridge. The south bridge 32 is also connected to either one or several peripheral component interface (PCI) buses 38. Connected to the PCI buses are slots for connection of peripherals such as displays, printers, etc. to the computing system. Important to the present discussion, one peripheral, (here shown connected to PCI Bus 0), is a video controller 42, such as a video graphic array (VGA), for controlling the display of information on a display 47 associated with the computing system.

With regard to the software-based computer maintenance systems, (PC Anywhere being one example), each host computing system 14 includes maintenance software 46b for operation on the CPU. The maintenance computing system 22 includes many of the same components and configurations as the host computing systems 14. Importantly, the maintenance computing system also includes maintenance software 46a. The software 46a and 46b are operating system (OS) based software, meaning that they operate in conjunction with the operating system and can be run only after the operating system of the computer is running.

During normal operation of the computing system, after the operating system has been initiated, problems with a host computing system 14 located on a network 12 can be observed at a remote location using the maintenance computing system 22. Specifically, when activated, health information concerning the host computing system is sent to the maintenance computing system 22. This health information may include data concerning the health of the hardware components of the host computing system 14, such as ambient temperature monitoring, PCI voltage, etc. This health information is gathered by the software 46b, compressed, and transmitted to the maintenance computing system. The software 46a of the maintenance computing system evaluates the health information to determine if there are any hardware problems with the host computing system 14.

Importantly, the software, 46a and 46b, also operate collectively to emulate the information displayed on the display terminal 47 of the host computing system 14 to the display 49 associated with the maintenance computing system 22 so that the information displayed on the host computing system can also be viewed by maintenance personnel operating the maintenance computing system 22. Specifically, the software 46b resident on the host computing system 14 obtains video data transmitted by the CPU of the host computing system to the video controller 42. The software 46b uses the video driver software of the operating system to retrieve the data. The software 46b, when commanded, retrieves the data corresponding to the data displayed on the terminal display 47 of the host computing system 14, compresses the data, and sends the data to the maintenance computing system 22. The software 46a resident on the maintenance computing system 22 receives the data, decompresses it, and displays the data on the display 49 associated with the maintenance computing system 22, where it can be viewed by maintenance personnel.

Although the above-discussed software-based system provides for remote maintenance of a networked computing system, there are some drawback and limitations to this approach. Specifically, as discussed, the software 46b resident in the host computing system, during a maintenance session, repeatedly receives, compresses, and sends a screen capture of the data displayed on the terminal display 47 of the host computing system 14. This can require a large amount of computing time and resources of the CPU associated with the host computing system, as sell as negatively affecting network bandwidth for transmission of the data. For example, if the video controller 42 of the host computing system outputs information for a color display that is 1024× 768, each data transmission by the software 46b can be rather large.

In this instance, if there are 16 bits per pixel or two (2) bytes, then 1024×768×2 bytes is approximately 1.5 megabytes of information for each frame of data representing the data displayed on the display terminal 47 of the host computing system 14 to the maintenance computing system 22. The software requires a significant amount of processing time from the CPU of the host computing system to collect and compress the data, and transmission of the data uses unacceptable amounts of network bandwidth.

Another issue with conventional software-based maintenance systems is that the software, 46a and 46b, resident on the host and maintenance computing systems is OS-based software and are only operable once the operating system has been initialized. As such, the software is not operable during power on and initialization of the host computing system. During start up of the computing system, the Basic Input Output System is initiated and a power on self test (POST) is performed. POST performs several tests of the hardware components of the computing system and displays the results of these tests in a text mode on the display 47 of the host computing system 14. It is only after POST has run that the operating system associated with the host computing system is initiated. As such, the text information displayed by POST to the display terminal 47 of the host computing system 14 is not accessible by the software, 46a and 46b, of the conventional software-based systems. Thus, the maintenance personnel located at the remote location cannot assess if there are problems with the host computing system that are found and flagged during POST.

FIG. 2B is an illustration of a conventional software/hardware hybrid system. A system according to this configuration has been developed by American Megatrends, Inc., who is also the current assignee of the present invention. In this system, snooping hardware 48 is added to each of the host computing systems, 14a–14n, to detect when the video controller is in a text mode and retrieve text data for display at the maintenance computing system 22. The snooping hardware is connected to the same PCI Bus to which the video controller 42 is connected. The host computing system also includes hardware, not shown, for assessing information related to the health of the computing system.

Further, the system includes bus master hardware 44 for retrieving and transmitting text and graphic data to the maintenance computing system 22. The bus master hardware includes a private network 45a separate from the main network 45b of the host computing system for transmission of data to the maintenance computing system. The private network 45a is typically preferred as a separate network connection so that the bandwidth of the main server connection of the host computing system 14 is not affected. In the discussions below, conservation of network bandwidth refers to this private connection. It is understood that conservation of bandwidth in the private network 45a is an important concern.

Importantly, with regard to the software/hardware hybrid system, the snooping hardware allows for capture of text mode data during POST and start up of the host computing system. Further, if the video controller and snooping hardware are connected to PCI Bus 0, the snooping hardware may be used to emulate keyboard and mouse commands to the host computing system.

Specifically, in operation, the snooping hardware 48 watches the PCI Bus for data traffic associated with the video controller. If the snooping hardware detects that the video controller is in the text mode, such as during POST, then the text data is available at a known location in the memory of the video controller. The text data is retrieved by the bus master hardware 44 and transmitted through the private network 45a associated with the bus master hardware to the maintenance computing system.

However, if the snooping hardware determines that the video controller is in the graphics mode, such as after the operating system has started, then the graphics data location is unknown to the snooping hardware, as it varies from controller to controller. In this instance, the present system must still use software 46b to gather the graphics data.

Specifically, the software 46b is OS-based software and uses the video driver associated with the operating system to retrieve the graphics data. The graphics data is then transmitted by the bus master hardware 48 via the private network 45a associated with bus master hardware to the maintenance computing system.

Importantly, as discussed, if the video controller and snooping hardware are connected to PCI Bus 0, the snooping hardware is also capable of emulating keyboard and mouse commands to the keyboard controller 36.

Although the software/hardware hybrid system illustrated in FIG. 2B provides several advantages over the conventional software-based systems, there are also some disadvantages with these conventional systems. Specifically, although the snooping hardware determines when the video controller is in a text mode, such as during POST, and can, via the bus master 44, transmit text data to the maintenance computing system, software 46b must still be used to collect graphic data. As with the conventional software-based systems, the software 46b of the software/hardware hybrid system retrieves, compresses, and transmits the graphical data, which requires added computing time and use of system resources of the CPU of the host computing system 14 and its network 45a bandwidth. Further, because both the conventional software-based and software/hardware hybrid systems require installation of software 46b on each computing system, there are also concerns with routine software updates which must be periodically performed for each system, especially when new versions of the operating system are added to the host computing systems.

In addition to the problems with software 46b, there are also problems concerning which PCI Bus the video controller is connected to in a given host computing system. Specifically, as stated the snooping hardware 48 must be on the same PCI bus as the video controller 42 to determine when the video controller is in a text mode. However, the snooping hardware 48 can only emulate keyboard and mouse commands if it is connected to PCI Bus 0. It is not always assured that the vide controller will located on PCI Bus 0. As such, if the video controller 42 is on a bus other than PCI Bus 0, the snooping hardware will not be located on PCI Bus 0 and cannot emulate keyboard and mouse commands.

With regard to FIG. 2C, some terminal emulation systems have been developed that alleviate the need for software on the host computing system. These systems 50 also attempt to reduce the amount of data transmitted to the maintenance computing system so as to reduce the affect on network bandwidth. These systems 50 are connected to the analog output used by the video controller 42 to transmit data to the display terminal 47 associated with the host computing system. These systems convert analog data output by the video controller 42 to digital data external from the video controller, compress the data, and send it across the network. In particular, these conventional systems periodically capture analog display data for different display times. The first set of display data is transmitted to the maintenance computing system. However, for remaining data captures, only the changes in the display data are transmitted. As such, less data is required to be transmitted either when there have been no changes in the display or only small changes.

FIG. 2C illustrates an example of these systems. In these systems, the CPU 24 of the computing system sends data to the video controller 42 for display on the display terminal 47. The video controller receives the data and converts it to analog form for transmission to the display terminal 47. These conventional systems 50 are connected between the video controller 42 and the display terminal 47. As the data is analog, these systems include an A/D converter 51, which converts the captured data to digital data. Each set of digital data is stored in different sections of registers, 53a–53n. Successive data sets are then compared to each other by the processor or by a specifically configured comparator, so that only the differences are transmitted to the maintenance computing system.

Although these conventional systems reduce the amount of data that must be sent for each new set of captured date, there is one significant drawback with these systems. Specifically, as mentioned, these conventional systems 50 capture and digitize analog data output by the video controller 42, which was converted from digital to analog data by the video controller. Errors are introduced into the data both in transforming the data to analog data and in digitizing the data. These errors may be somewhat random, such that two identical sets of analog screen data converted to digital format at different times may be completely different. These errors may alter the display data such that more of the data seems to be different between different sets of captured data. For example, even if the display has not changed, two sets of screen captures of the data may be different when compared due to the errors in converting the data from digital to analog and back to digital. As such, the system may transmit data to the maintenance computing system, even when there has been no change in the display, thereby requiring huge amounts of data to be transmitted over the private network 50, making it a slow process. This will also make the visual experience of the graphics screen at 22 sluggish.

SUMMARY OF THE INVENTION

The present invention provides systems and methods that overcome many of the above-expressed deficiencies with conventional terminal emulation systems. Specifically, the present invention provides systems and methods that reduce the amount of data that is transmitted to the maintenance computing system for terminal emulation. This reduction in data, in turn, minimizes the effects of terminal emulation on network bandwidth. Further, the systems and methods of the present invention uses a hardware-based system that alleviates the need for software resident on host computing system for collection, compression, and transmission of data. This alleviates use of the CPU of the host computing system for terminal emulation. Additionally, the systems and methods of the present invention use a USB interface connected to the USB port of the host computing system. The USB interface can be used for keyboard, mouse, and storage device emulation. This is an advantage over conventional software/hardware hybrid systems, which require connection to the PCI Bus 0 for keyboard and mouse emulation. The USB interface also provides for remote reboot of the host computing system using a virtual drive or installation of new software on the host computing system.

In particular, the systems and methods of the present invention overcome problems with excessive use of network bandwidth to transmit data to the maintenance computing system. The systems and methods of the present invention operate in conjunction with a video controller that outputs both digital and analog signal representations of the data to be displayed by the display terminal associated with the host computing system. Such video controllers are commonly used in Notebook PCs, but are applicable for use in most computing systems. These controllers simultaneously output analog and digital data. In many instances, the analog data is used as an output to an overhead projector or other similar analog system, while the digital output is used to send text and graphic data to a TFT display terminal associated with the computing system.

The systems and methods of the present invention use the digital output data, as opposed to the analog output data for frame capture and frame comparisons. The systems and methods of the present invention transmit a first set of frame data to the maintenance computing system, and thereafter transmit only data representing changes in the display data. Importantly, the digital data output by the video controller is not converted, but instead is the representation of the data as received from the CPU. Because the digital data has not been converted, there are no conversion errors in the data. As such, successive frame captures of the same display data should be very similar, with little to no difference in the data. Comparisons of different frames should reveal only the true changes in the display data. Thus, by using the digital data output by the video controller, the systems and methods of the present invention can reduce the amount of data transmitted to the maintenance computing system, thereby freeing bandwidth on the network.

In more detail, the system of the present invention includes management hardware that includes a frame grabber connected to the digital output of the video controller. The frame grabber of the present invention captures the digital data output by the video controller for transmission to a maintenance computing system across a network. Specifically, the frame grabber of the present invention uses the digital flat panel output of the video controller, which can be obtained simultaneous to the standard analog output to the display terminal. The system of the present invention further includes storage memory for storing data captured by the frame grabber and comparators for comparing successive data sets. Further, the system of the present invention includes a processor and a connector for connecting the system of the present invention to the network through a private connection.

In operation, the frame grabber captures data sets of the digital display data and control information output by the video controller. Each set of captured data is stored in memory, with the first set of captured data being transmitted across the network to the maintenance computing system for display on a display terminal associated with the maintenance computing system. Successive sets of data are compared to one another to determine the differences in the data. These differences, if any, represent changes in the data displayed on the display terminal of the host computing system. The difference data received from these comparisons is transmitted to the maintenance computing system to update the information displayed on the display terminal associated with the maintenance computing system to match the data displayed on the host computing system.

In addition to reducing the amount of data transmitted to the maintenance computing system, the systems and methods of the present invention also typically do not require installation of software on the host computing system. Specifically, the system of the present invention is typically embodied in management hardware in the form of an electronic card that is inserted into a slot of each of the host computing systems. As the management hardware of the present invention is connected to the output of the video controller, it is capable of capturing both text and graphical data. This is unlike the hardware of the conventional software/hardware systems, which is connected to the PCI Bus associated with the video controller. These conventional systems require software resident on the host computing system to determine the location of graphic data in the memory of the video controller.

Further, the management hardware of the present invention is capable of capture, compression, and transmission of the data. As this is performed on board the system card, as opposed to the use of software, there is no overloading of the host computing system's CPU to perform these operations.

The system of the present invention also includes a dedicated universal serial bus (USB) interface. The USB interface connects to the USB port of the host computing system. The USB interface allows the system of the present invention to emulate a keyboard and mouse so that commands may be provided to the CPU of the host computing system from the maintenance computing system via the USB interface. Importantly, this aspect of the present invention alleviates the need for the video controller and management hardware to be located on PCI Bus 0 to emulate the keyboard and mouse, as is required in the conventional software/hardware hybrid systems. Instead, the design of the management hardware of the present invention allows the video controller to be connected to any of the PCI Buses, with keyboard and mouse emulation occurring via the USB interface.

Further, and importantly, the USB interface of the management hardware also allows for emulation of a CD-ROM or floppy disk. Specifically, the USB interface of the present invention appears to the host computing system as an added keyboard, mouse, and storage device. As such, the USB port allows for keyboard, mouse, and data storage emulation from a remote location. The data storage emulation may have several advantageous uses. For example, the USB interface could be used to boot a host computing system using software located in a CD inserted in the CD-ROM or floppy disk inserted in the disk drive of the maintenance computing system. For example, for remote system boot up, the system setup of the host computing system via keyboard emulation could be configured to boot from the USB port. In this instance, the USB interface is used to emulate the CD-ROM or floppy disk of the maintenance computing system to the host computing system. As such, boot software loaded in the CD-ROM or floppy disk drive of the maintenance computing system could be used to boot the host computing system. In a similar manner, the virtual CD-ROM and floppy disk could be used to remotely install or upgrade existing software on the host computing system.

The present invention also includes hardware for determining the health of the host computing system. This hardware is capable of retrieving the health information from the host computing system and determining if there are any problems with the hardware. If there is a hardware problem, the processor transmits the data to the maintenance computing system.

In typical embodiments, the management hardware of the present invention receives power from the PCI slot to which it is connected. However, as a backup, the management hardware of the present invention also includes an AC adapter and AC outlet connector for supplying power via an AC outlet to the management hardware. This allows the management hardware to receive power, even if the host computing system loses power. Further, the management hardware may include a battery backup for its own power requirements. The backup battery power is available in instances in which both AC outlet power and PCI slot power are not available. The management hardware includes logic for detecting when power is not present from the PCI slot or from the AC outlet power. In this instance, the backup battery will provide power for a short time, and the management hardware will generate alerts via its private network, paging, etc. alerting the maintenance personnel that power is not available.

BRIEF DESCRIPTION OF THE DRAWINGS

Figure 1:
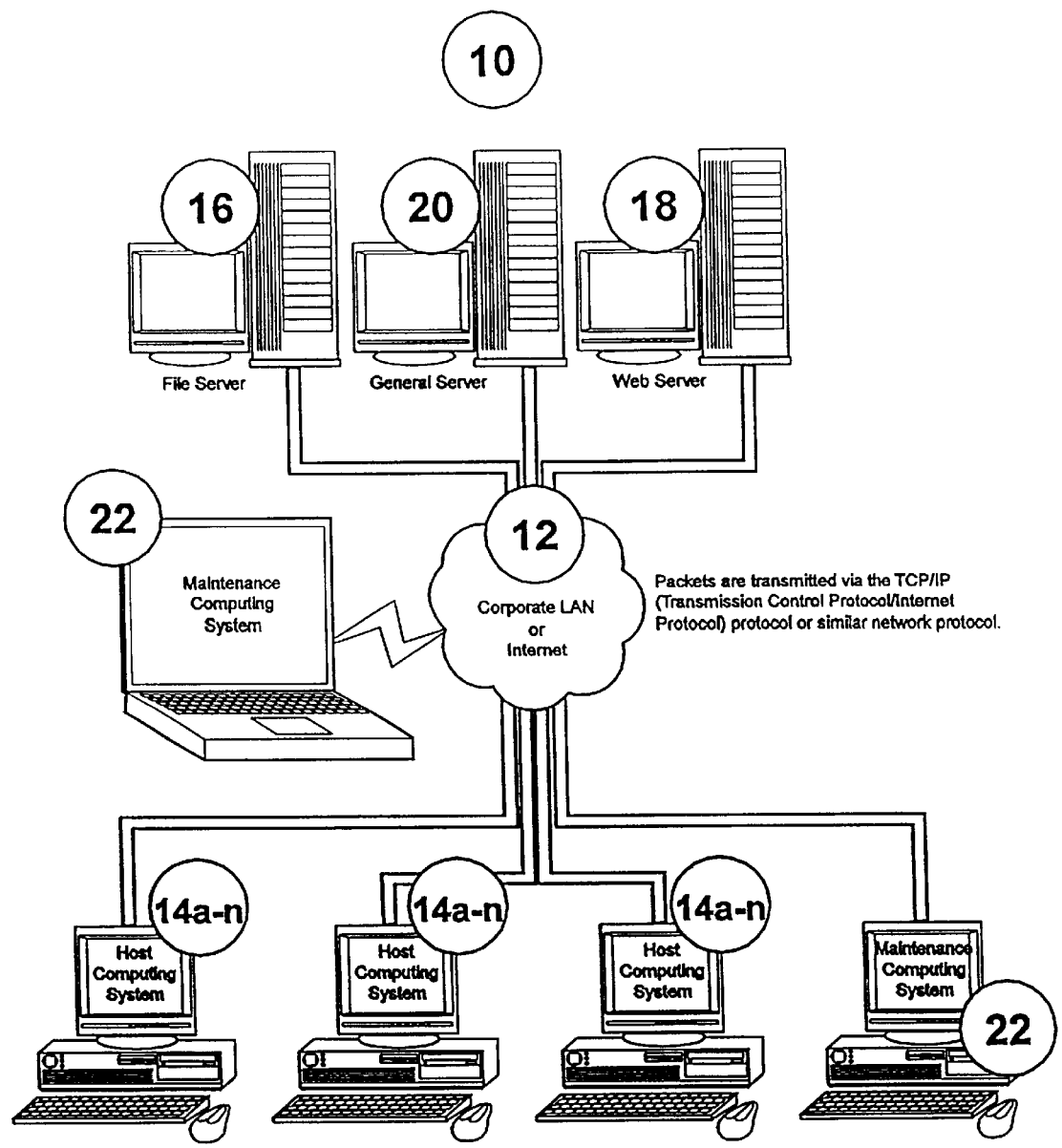

Having thus described the invention in general terms, reference will now be made to the accompanying drawings, which are not necessarily drawn to scale, and wherein:

FIG. 1 is a generalized block diagram of a network system within which the systems and methods of the present invention may be implemented, according to one embodiment of the present invention.

Figure 2A:
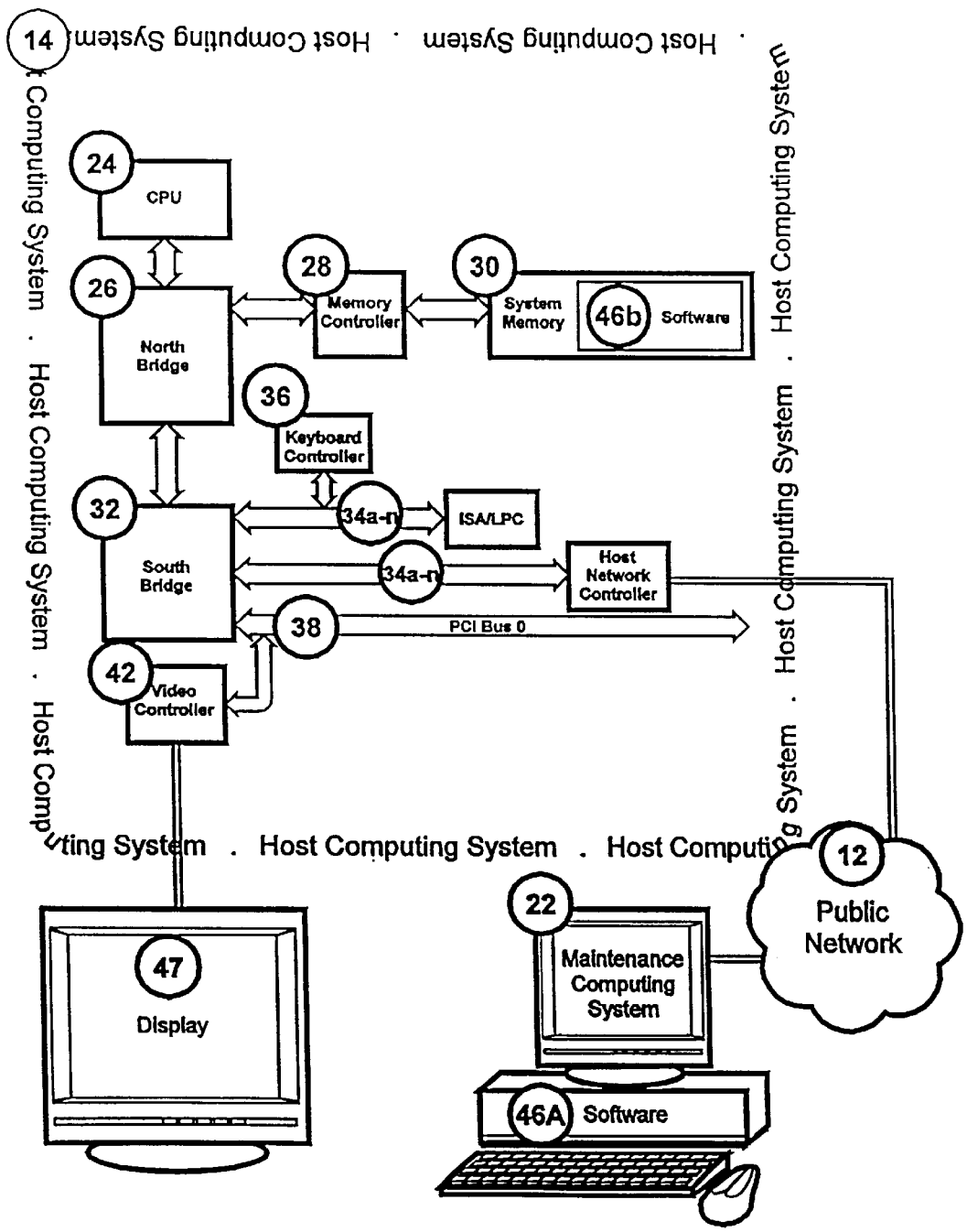

FIG. 2A is a generalized block diagram of a prior art software-based maintenance system implemented in the network of FIG. 1 to emulate data displayed on the display terminal of a host computing system to a display terminal on a maintenance computing system.

Figure 2B:
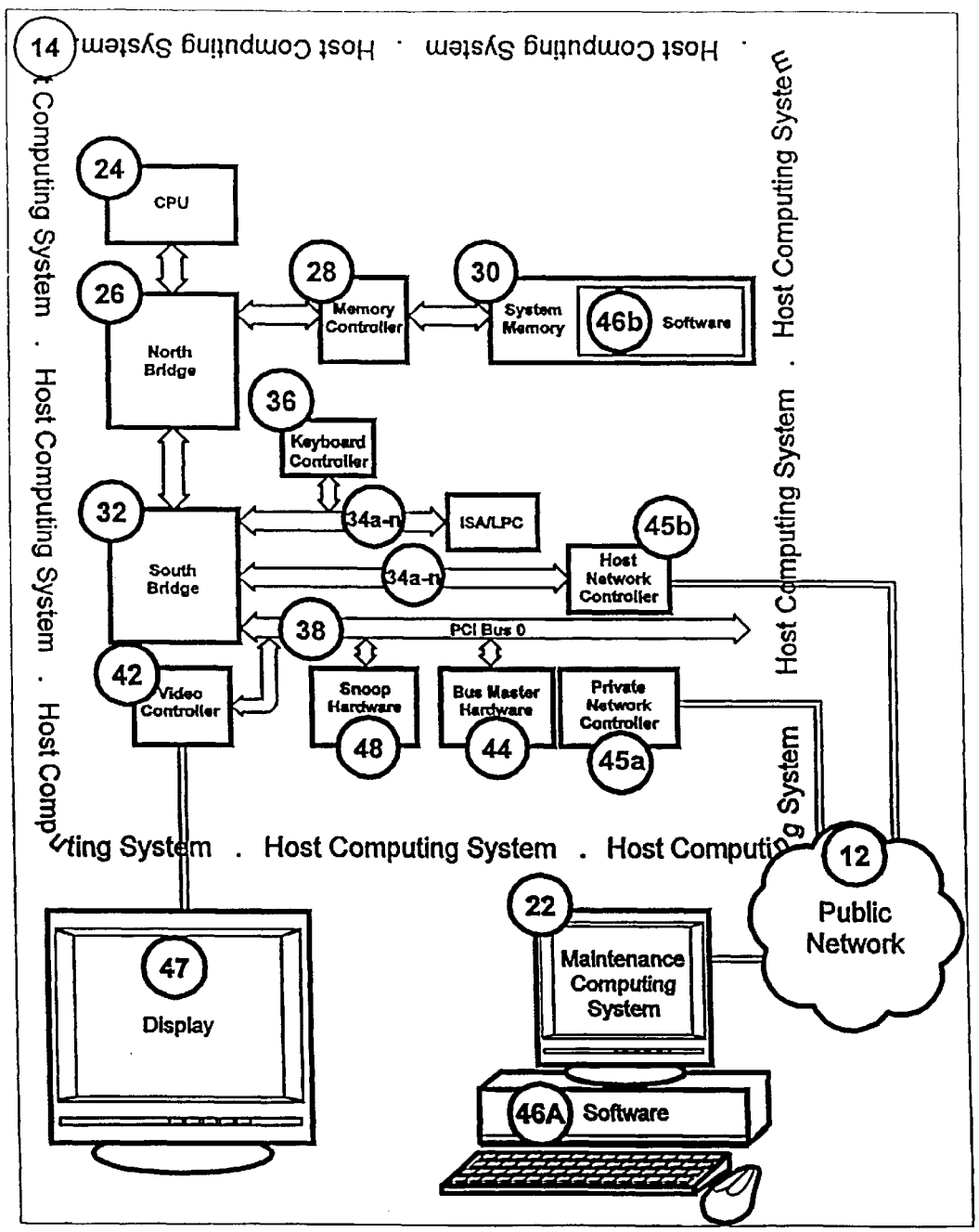

FIG. 2B is a generalized block diagram of a prior art software/hardware hybrid maintenance system implemented in the network of FIG. 1 to emulate data displayed on the display terminal of a host computing system to a display terminal on a maintenance computing system.

Figure 2C:
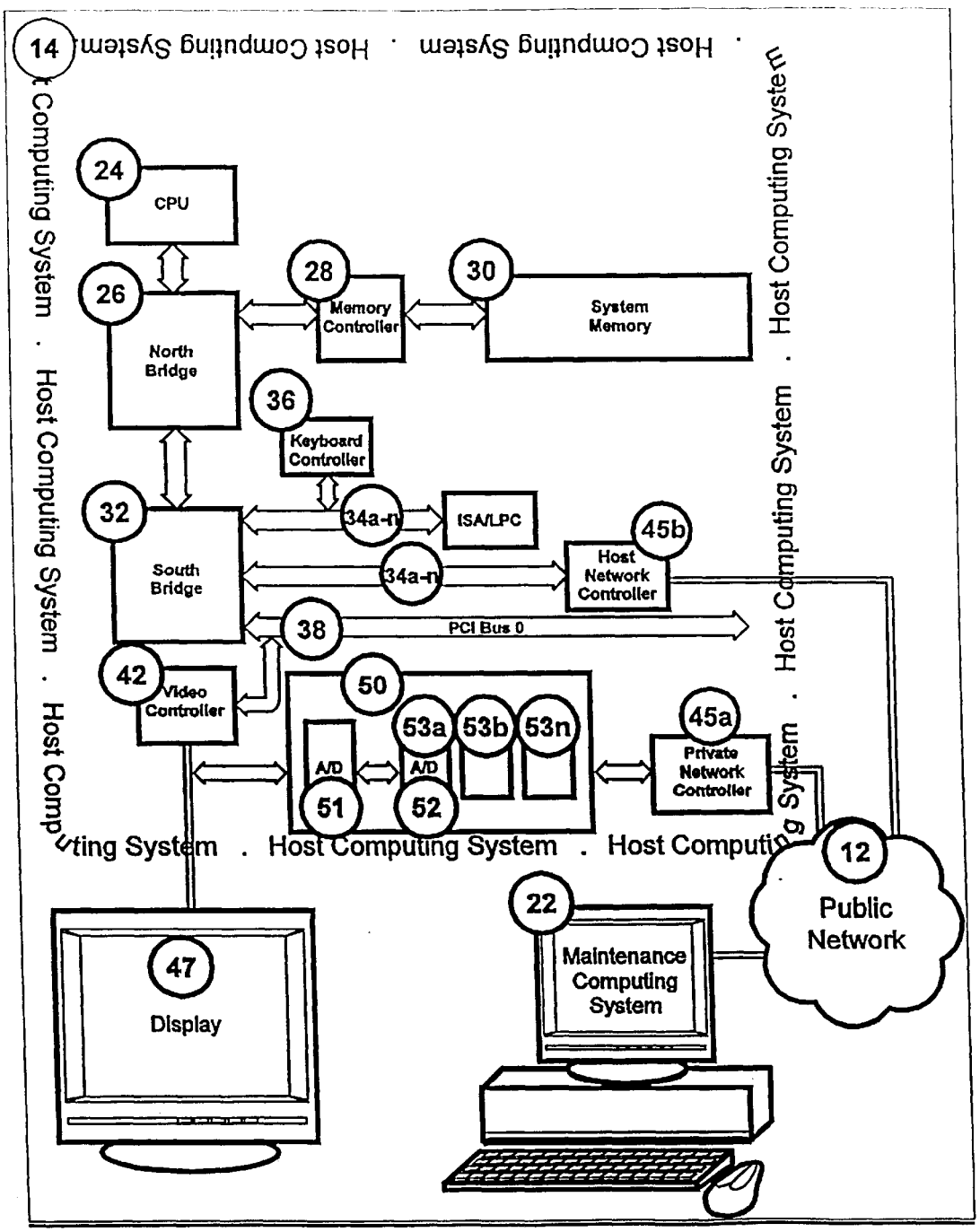

FIG. 2C is a generalized block diagram of a prior art maintenance system implemented in the network of FIG. 1 to emulate data displayed on the display terminal of a host computing system to a display terminal on a maintenance computing system by digitizing data output from the video controller of the host computing system and sending only changes in the display data to the maintenance computing system.

Figure 3A:
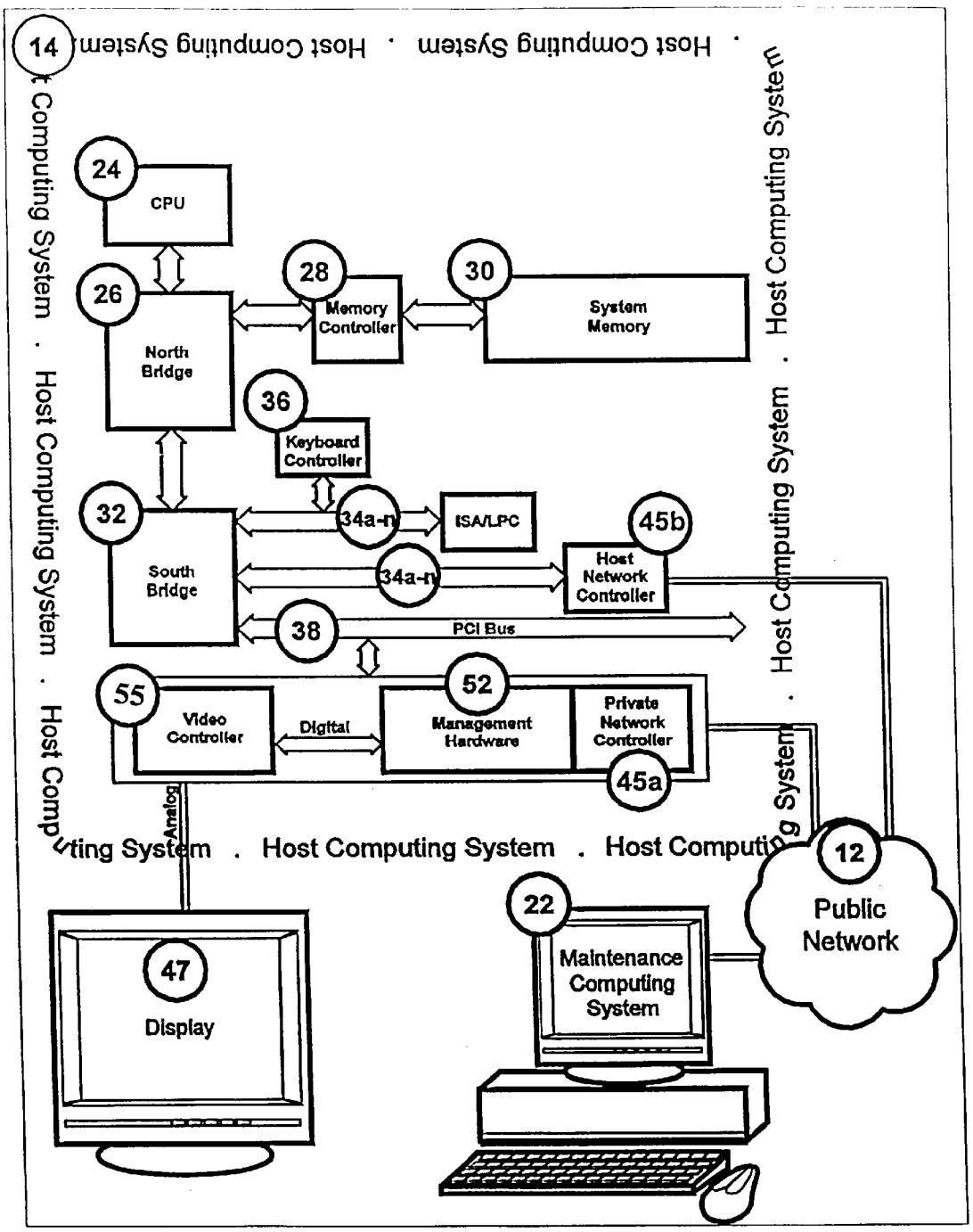

FIG. 3A is a generalized block diagram of maintenance system according to one embodiment of the present invention implemented in the network of FIG. 1 to emulate data displayed on the display terminal of a host computing system to a display terminal on a maintenance computing system.

Figure 3B:
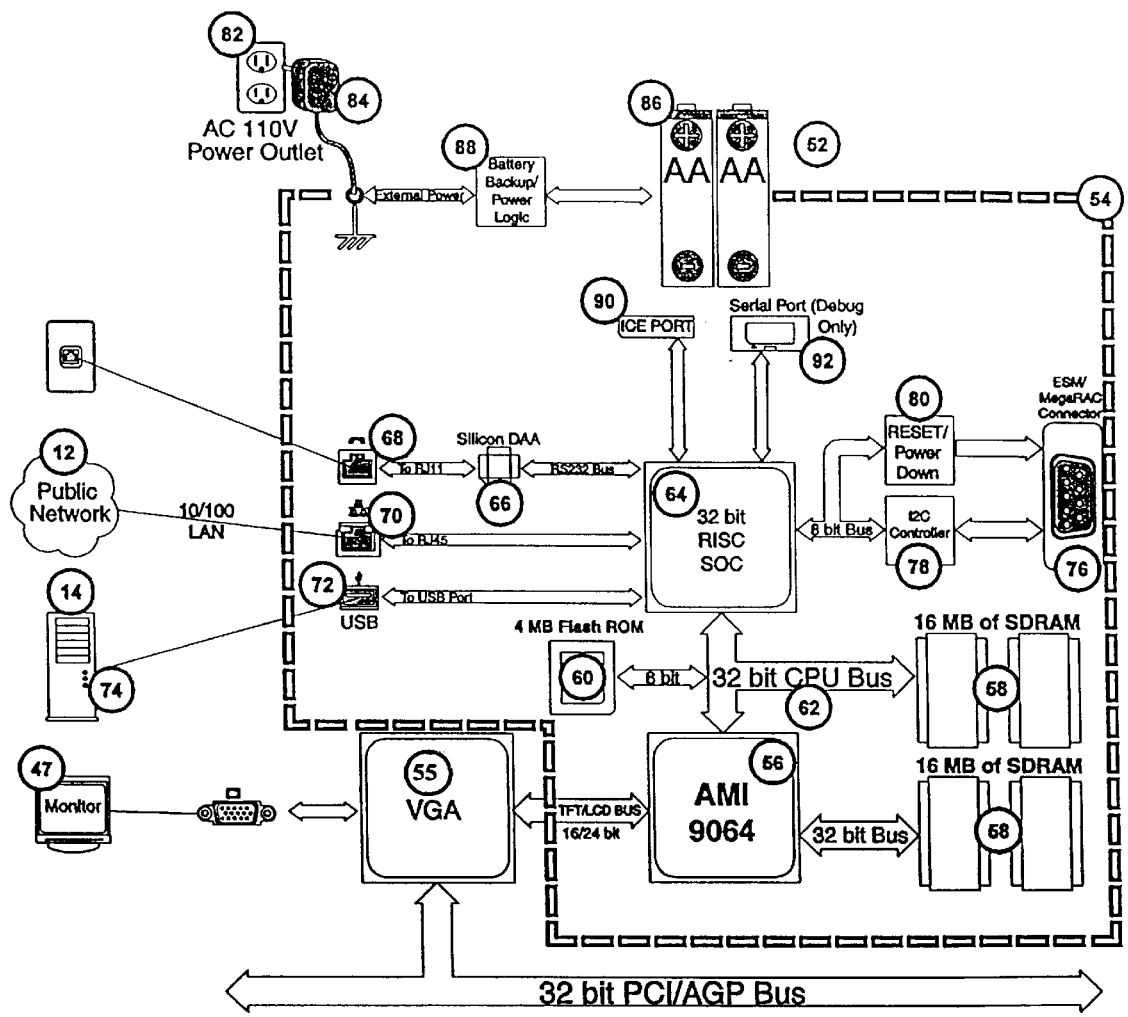

FIG. 3B is a schematic diagram of the of maintenance system according to one embodiment of the present invention implemented in a host computing system.

Figure 4A:
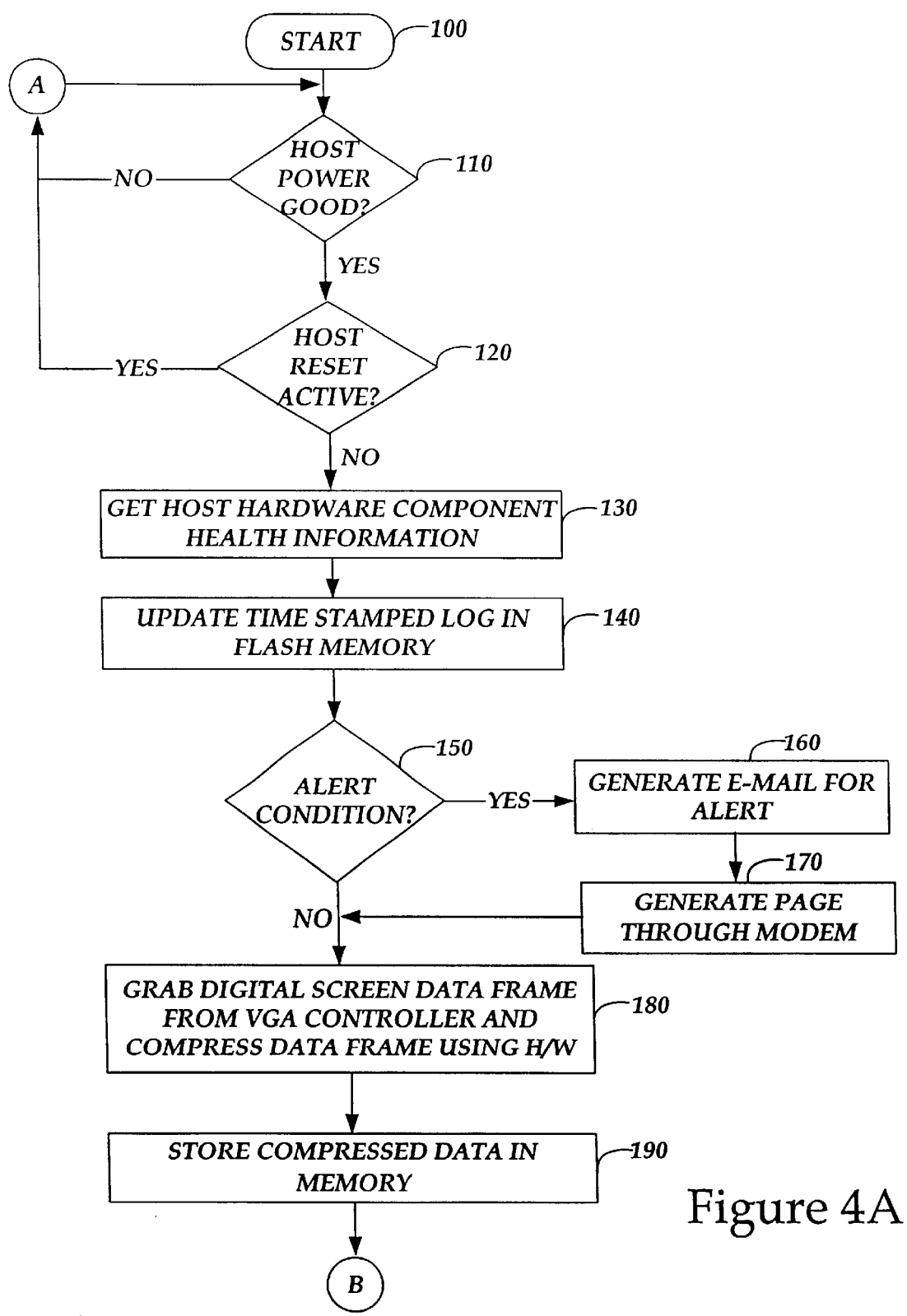
Figure 4B:
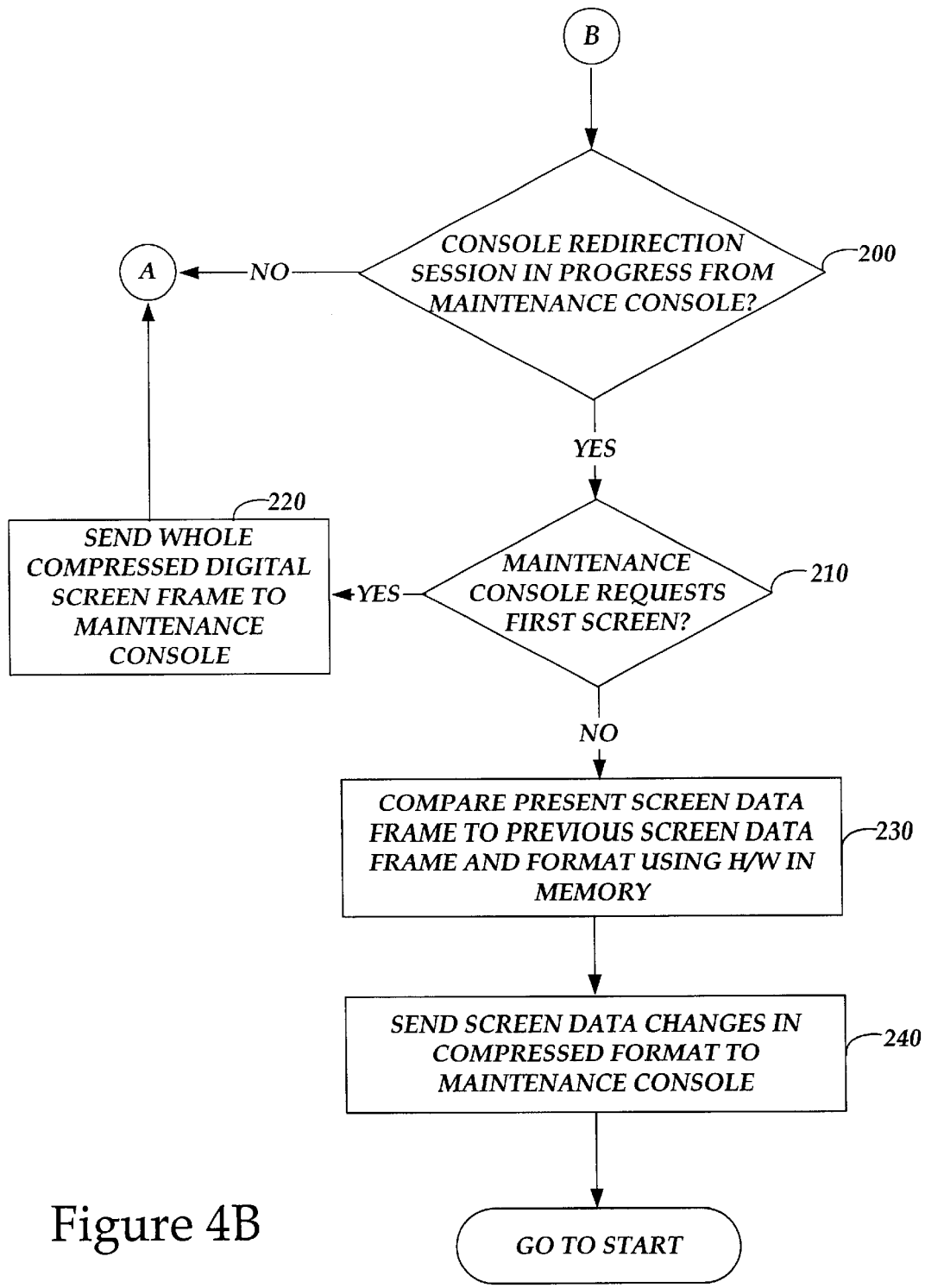

FIGS. 4A and 4B are generalized block diagrams of the operations performed by the maintenance system according to one embodiment of the present invention implemented in the network of FIG. 1 to emulate data displayed on the display terminal of a host computing system to a display terminal on a maintenance computing system.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 3A illustrates a general embodiment of the present invention as illustrated in the network system 10. FIG. 3 illustrates a host computing system 14, network 12, and a maintenance computing system 22. These devices are all part of larger network system, such as the system illustrated in FIG. 1. The host computing system 14 associated with the present invention is similar to those previously discussed. However, the host computing system includes a video controller 55 capable of outputting digital data to be displayed by a display terminal. These types of video controllers are commercially available and are typically implemented in laptop computing systems. VGA video controllers capable of outputting digital data are manufactured and sold by S3Graphics, Inc. located in Fremont, Calif., ATI Technologies, Inc. located in Thornhill, Ontario, Canada, Trident Microsystems, Inc. located in Sunnyvale, Calif., and Intel Corporation, located in Santa Clara, Calif., to name a few. The system 52 of the present invention is connected to the digital output of the video controller from which it captures digital display data for transmission to the maintenance computing system 22 via its private network and public network 12.

FIG. 3B is a more detailed description of one embodiment of the management hardware 52 of the present invention. Specifically, the system of the present invention according to one embodiment is embodied as management hardware in a card 54 that is connected to the host computing systems 14 via a PCI/AGP Bus 0, to one slot of the host computing system. The system of the present invention is not limited to a card configuration, and instead could be a more permanent installation in the host computing system.

The system 52 of the present invention includes a frame grabber 56 connected to the TFT/LCD bus of a video controller 55. As mentioned, the TFT/LCD bus is a digital output of display data from the video controller representing the data to be displayed on the display terminal 47 associated with the host computing system. The system of the present invention also includes a processor/CPU 64 for communicating data received from the frame grabber to the maintenance computing system 22. The frame grabber includes dedicated memory SDRAM 58a connected via bus 62, and the processor includes dedicated memory SDRAM 58b. The CPU 64 can access frame grabber memory 58a via the bus 62 and frame grabber 56. The system 52 of the present invention also includes a transmission device such as a modem 66 and connector 68 for connecting the system 52 to the maintenance computing system via telephone line. Alternatively, the system also includes a network connection point 70 as a transmission device for connecting the system to the maintenance computing system via the network 12. This network connection is typically a private connection separate from the main connection of the host computing system to the network 12. The private connection is separate so that it does not effect the network bandwidth of main network connection of the host computing system to the network.

Importantly, the system further includes a universal serial bus (USB) interface 72 for connecting the system to the USB port 74 of the host computing system 14. Specifically, the system 52 of the present invention is configured such that it is connected to the USB port of the host computing system 14. The USB interface is presented to the host computing system as an extra keyboard and mouse on top of the host computing system's physical keyboard and mouse. In operation, commands from the keyboard and mouse of the maintenance computing system 22 pass across the network 12, through the card 54 to the USB port 74 of the computing system.

The USB interface also presents itself as an added storage device, such as a CD-ROM of floppy disk. This allows the system of the present invention to emulate a virtual CD-ROM or floppy disk host computing system. These virtual devices can be used to boot the host computing system remotely using the maintenance personnel's choice of operating system. For example, for remote system boot up, the system setup of the host computing system via keyboard emulation could be configured to boot from the USB port. In this instance, the USB interface is used to emulate the CD-ROM or floppy disk of the maintenance computing system to the host computing system. As such, boot software loaded in the CD-ROM or floppy disk drive of the maintenance computing system could be used to boot the host computing system. In a similar manner, the virtual CD-ROM and floppy disk could be used to remotely install or upgrade existing software on the host computing system.

With reference to FIG. 3B, the system of the present invention further includes hardware for assessing the health of the host computing system. Specifically, the system 52 of the present invention includes an I2C controller 78 that receives information concerning the health of the host computing system 14 via connector 76. This health information may include any number of selected parameters, such as ambient temperature monitoring, PCI voltages, battery voltage, to name a few. The system 52 of the present invention also includes a controller 80 connected to the slot connector 76. This controller 80 is configured to transmit commands to the host computing system to reset or power down. As such, the host computing system 14 may be rebooted from a remote location by commanding the controller 80 to reset or power down the host computing system.

In typical configurations, the management hardware 52 of the present invention receives operating power via the PCI slot of the host computing system to which it is connected. However, as a first backup, the management hardware 52 of the present invention may include an independent AC adapter 84 and AC outlet connector 82 for connection to a wall outlet. If power is not available from the PCI slot for any reason, the management hardware of the present invention will use power from the AC adapter.

As a further backup, the management hardware of the present invention may further include a battery pack 86, or other similar on board power source. Associated with the battery pack 86 and the AC power input is logic 88 for detecting when AC power is not available. In these instances, the logic 88 switches the power supply to the system card 54 from the AC power source to the battery pack 86. In this instance, the backup battery will provide power for a short time, and the management hardware will generate alerts via its private network, paging, etc. alerting the maintenance personnel that power is not available.

With reference to FIG. 3B, the system of the present invention may also include an ICE port 90 and a serial port 92. The serial port 92 is used as an entry way for debugging of the system 52.

As mentioned above, the system of the present invention is used to capture copies of the data and control information to be displayed on a host computing system. This data can then be transmitted to a maintenance computing system located at a remote location and displayed on a display terminal of the maintenance computing system. Importantly, the system of the present invention is connected to the digital output of the video controller of the host computing system. The system transmits a first set of data representing the data displayed on the display terminal of the host computing system to the maintenance computing system via the network so that the data may be viewed by maintenance personnel. Thereafter, the system of the present invention compares successive data sets from the video controller and compares each set to a previous data set. The system then transmits only the differences to the maintenance computing system so that the display on the maintenance computing system can be updated with the new information. This reduces the amount of data transmitted. Further, and importantly, because the system is connected to the digital output of the video controller as opposed to the analog output, there are less errors in the data due to conversion from digital to analog by the video controller and from analog to digital by more conventional maintenance systems. As such, when the data is compared to previous data sets, the differences between the data sets are due to real changes in the display data, as opposed to errors in the display data.

Further, the system of the present invention also gathers data related to the health of the host computing system. This health data is analyzed by the system 52 and any problems are also transmitted to the maintenance computing system, or alternatively, all of the gathered health data is transmitted.

FIGS. 4A and 4B illustrate the operation of the present invention according to one embodiment. Looking at FIG. 4A, during operation (100), the controller 80 determines whether the host computing system 14 is powered up. (See step 110). If powered up, the controller 80 also determines whether the host computing system 14 reset is active. (See step 120). If the host computing system is not powered up or the reset is active, the steps are repeated. Once it is determined that the host computing system is powered up and active, the I2C controller 78 receives health information related to the host controller. (See step 130). This health information may include data concerning the health of the hardware components of the host computing system, such as ambient temperature monitoring, PCI voltage, etc. The controller 64 stores this information in flash memory 60 and updates the time stamp for the data (See step 140). Further, the processor evaluates the health information to determine if there are any hardware problems. (See step 150). This valuation may involve comparing the received data to stored threshold parameters to determine if the received data exceeds these thresholds, or the data may be in the form of flags received by the I2C controller indicating hardware errors. If the controller 64 determines that there are hardware errors, the controller 64 may generate an email alert or page via the modem 68 to the maintenance personnel. (See steps 160 and 170).

In addition, the frame grabber 56 of the present invention grabs or gathers digital data from the digital output of the video controller 50. (See step 180). During start up and POST, the frame grabber grabs text data and when the OS is initiated and operating, it grabs graphic data bound for the terminal 47. The frame grabber in one embodiment of the present invention gathers data on a cycle of seventy (70) times per second. The frame grabber is typically operated such that it constantly grabs data from the output of the video controller. As each data frame is gathered, it is stored in RAM 58. (See step 190). Further, and importantly, each frame of data is also compared to the frame preceding it to determine changes in the data displayed by the host computing system. Specifically, the RAM 58 is partitioned such that one data frame is stored in one partition and a next data frame is stored in another partition. The data is then compared to each other using standard comparison techniques, and data representing the differences is stored in a third partition of the RAM 58. As stated, the capture and comparison of data frames is typically a continuous process, with each data frame being stored along with data representing changes between sequential frames. After the partitions of the RAM have filled, the oldest data frames and difference data is deleted and new frames and comparison data is added.

Proceeding now to FIG. 4B, during a maintenance session of the host computing system, (see step 200), the maintenance personnel will command the maintenance computing system 22 to retrieve data from the host computing system 14 via the system 52 of the present invention. When accessed by the maintenance computing system 22, the processor 64 of the system will initially access the SDRAM and transmit the most recent data capture from the data grabber 56. Specifically, the processor will retrieve the data, compress it, and send it via the network 12 to the maintenance computing system 22. (See steps 210 and 220).

Importantly, after the first full data set is sent to the maintenance computing system, the processor 64 of the present invention advantageously reduces processing time by transmitting only changes in the display data received in successive data sets from the frame grabber to the maintenance computing system. Specifically, after the first full data set has been sent, the processor will thereafter retrieve from RAM and transmit data representing the changes in the display data, as opposed to full data sets each time. (See steps 230 and 240). The maintenance computing system 22 will receive these data sets and update the data displayed on the display terminal 49 associated with the maintenance computing system 22, such that the display on the display terminal of the maintenance computing system matches the data displayed on the host computing system 14.

In some instances, there may be abrupt changes in the data displayed by the host computing system, such as when there is a screen change or a toggle between different screens. In these instances, the number of changes between two subsequent data frames captured by the frame grabber 56 of the present invention may be fairly large, such that it requires more computing time and resources to implement the changes, as opposed to merely refreshing the display terminal 49 of the maintenance computing system 22. In these instances, the processor 64 of the present invention will transmit the data set collected by the frame grabber, as opposed to the difference data between the current data frame and previous data frame. Specifically, in some embodiment, the processor 64 of the present invention may periodically refresh the display terminal 49 of the maintenance computing system 22 by transmitting a complete new set of data as received from the frame grabber 56. In other embodiments, the processor of the present invention may compare the size of the data sets containing the differences between two successive data frames. If the size of the file is fairly large such that it exceeds a set threshold value, the processor of the present invention will transmit an entire new data frame to the maintenance computing system 22 to update the display terminal 49.

As discussed previously, the system of the present invention includes an USB interface, which may be used to input keyboard or mouse commands to the host computing system. With reference to FIG. 4, while constantly grabbing frames of the digital output by the video controller and transmitting changes to the maintenance computing system, the processor 64 of the present invention also listens for commands from the maintenance computing system to place control commands on the USB interface 72 to thereby control the host computing system. These commands may be keyboard command or mouse commands. The USB interface may also be used as a virtual floppy disk or CD-ROM to run software or install software on the host computing system via the network 12.

The system of the present invention provides several advantages over the prior art maintenance system. Specifically, the system of the present invention is implemented using an on board system that does not require the installation of software on each computing system. Further, the system provides for capture, compression, and transmittal of data independent of software, thereby reducing if not eliminated the dependency on the CPU and other system resources of a host computing system. The system of the present invention can be used to capture both text and graphical data with one hardware frame grabber.

Further, by capturing digital data instead of analog data from the video controller, the system of the present invention can more accurately determine the differences between two successive sets of display data, and transmit less data to the maintenance computing system. Additionally, the USB interface of the present invention allows the system to provide keyboard and mouse control commands to the host computing system, as well as emulate a floppy disk or CD-ROM for running or installing software via the network. The present invention also includes hardware for determining the health of the hardware components of the host computing system and transmit this health information to the maintenance computing system. Further, the system of the present invention includes an on board power supply and associated logic that allows the system to remain on even if the power source of the host computing system is turned off.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for transmitting to a remote location information related to a host computing system, said apparatus comprising:
   a video controller that simultaneously outputs digital data of a first video output representing data for display and outputs a second video signal of second video output for display on a terminal associated with the host computing system;
   a frame grabber in electrical communication with a digital output of the video controller, said frame grabber capable of collecting sets of data output in digital form from the video controller independent of an analog to digital converter, wherein each digital data set represents a frame of data for display;
   a storage device in electrical communication with said frame grabber for storing each of the digital data sets collected by said frame grabber;
   a comparator for comparing a current and a previous digital data set collected by said frame grabber and storing in said storage device a difference data set representing differences between the current and previous digital data set;
   a transmission device for transmitting said data sets to a remote location for display; and
   a controller in electrical communication with the host computing system, wherein said controller receives information related to the health of hardware of the host computing system for transmission to a remote location.

2. An apparatus according to claim 1 further comprising a processor in electrical communication with said storage device and said transmission device, wherein said processor at the beginning of a maintenance session, transmits a current data set to a remote location and thereafter transmits difference data sets provided by said comparator representing changes in the data for display.

3. An apparatus according to claim 2 further comprising a universal serial bus (USB) interface in electrical communication with said processor and for connection to a USB port of the host computing system, wherein said processor inputs keyboard and mouse commands to the host computing system via said USB interface.

4. An apparatus according to claim 3, wherein said transmission device transmits data sets to a remote maintenance computing system having at least one storage device, and wherein said processor, via said USB interface, emulates the storage device of the remote maintenance computing system to the host computing system such that files and information stored in the storage device of the maintenance computing system can be accessed by the host computing system.

5. An apparatus according to claim 1 further comprising a controller in electrical communication with the host computing system, wherein said controller is capable of at least one of powering down and resetting the host computing system.

6. An apparatus according to claim 1 further comprising an AC outlet adapter capable of providing power for use by said apparatus if said apparatus does not receive power from the host computing system.

7. An apparatus according to claim 1 further comprising a back up power source for providing power to said apparatus.

8. An apparatus according to claim 7 further comprising logic in electrical communication with said backup power source, wherein said logic applies power from said backup source to said apparatus if other power sources are not available.

9. An apparatus according to claim 1, wherein said transmission device is a processor and network connector for transmitting information via a network to a remote location.

10. A method for transmitting to a remote location information related to a host computing system, where the host computing system has a video controller that outputs digital data from a first video signal output representing the data for display while simultaneously outputting a second video signal from a second video signal output for display on a terminal associated with the host computing system, said method comprising:
    while the second video signal is being output for display from the video controller, simultaneously collecting sets of data output in digital form from the first video signal output of the video controller independent of an analog to digital converter, wherein each digital data set represents a frame of data for display;
    storing each of the digital data sets collected by said collecting step in a storage device;
    comparing a current and a previous digital data set collected by said collecting step;
    storing the storage device a different data set representing differences between the current and previous digital data set; and
    transmitting data sets to a remote location for display in addition to locally viewing a display at the terminal associated with the host computing system.

11. A method according to claim 10, wherein transmitting step comprises transmitting at the beginning of a maintenance session a current data set to a remote location and thereafter transmitting difference data sets provided by said comparing step representing changes in the data for display.

12. A method according to claim 11 further comprising emulating keyboard and mouse commands via a universal serial bus (USB) port associated with the host computing system.

13. A method according to claim 12, wherein said emulating step further comprises emulating via the USB port associate with the host computing system a storage device of a remote maintenance computing system to the host computing system such that files and information stored in the storage device of the maintenance computing system can be accessed by the host computing system.

14. A method according to claim 10 further comprising the step of receiving information related to the health of hardware of the host computing system for transmission to a remote location.

15. A method according to claim 10 further comprising the step of supplying power from a backup power source if other power sources are not available.

16. A method according to claim 10, wherein said transmitting step transmits information via a network to a remote location.

17. The method of claim 10, wherein host computing system has a first card containing the video controller and comprises a second card comprising the frame grabber.

18. The method of claim 10, wherein the host computing system has a card containing the video controller, the frame grabber, the storage device, the comparator, and the transmission device.

19. The method of claim 10, wherein simultaneously collecting sets of data output in digital form comprises simultaneously collecting the sets of data from a TFT/LCD bus.

20. The method of claim 10, wherein simultaneously outputting the second video output signal comprises outputting an analog video signal that is output from the second video output.

21. A system for transmitting to a remote location information related to a computing system, said apparatus comprising:
    a host computing system having a video controller that simultaneously outputs digital data of a first video output representing data for display an outputs a second video signal of a second video output for display on a terminal associated with the host computing system;
    a frame grabber in electrical communication with the digital first video output of said video controller, said frame grabber capable of collecting sets of data output in digital form from said video controller independent of an analog of digital converter, wherein each digital data set represents a frame of data for display;
    a storage device in electrical communication with said frame grabber for storing each of the digital data sets collected by said frame grabber;
    a comparator for comparing a current and a previous digital data set collected by said frame grabber and storing in said storage device a difference data set representing differences between the current and previous digital data set; and
    a transmission device for transmitting said data sets to a remote location so for display in addition to locally viewing a display at the terminal associated with the host computing system.

22. A system according to claim 21 further comprising a processor in electrical communication with said storage device and said transmission device, wherein said processor at the beginning of a maintenance session, transmits a current data set to a remote location and thereafter transmits difference data sets provided by said comparator representing changes in the data for display.

23. A system according to claim 22 further comprising a universal serial bus (USB) interface in electrical communication with said processor and for connection to a USB port of the host computing system, wherein said processor inputs keyboard and mouse commands to the host computing system via said USB interface.

24. A system according to claim 23, wherein said transmission device transmits data sets to a remote maintenance computing system having at least one storage device, and wherein said processor, via said USB interface, emulates the storage device of the remote maintenance computing system to the host computing system such that files and information stored in the storage device of the maintenance computing system can be accessed by the host computing system.

25. A system according to claim 21 further comprising a controller in electrical communication with the host computing system, wherein said controller is capable of powering down and resetting the host computing system.

26. A system according to claim 21 further comprising a controller in electrical communication with the host computing system, wherein said controller receives information related to the health of hardware of the host computing system for transmission to a remote location.

27. The system of claim 21, further comprising a first card containing the video controller and a second card comprising the frame grabber.

28. The system of claim 21, further comprising a card containing the video controller, the frame grabber, the storage device, the comparator, and the transmission device.

29. The system of claim 21, wherein the first video output comprises a TFT/LCD bus.

30. The system of claim 21, wherein the second video output signal comprises an analog video signal that is output from the second video output.

31. An apparatus for transmitting to a remote location information related to a host computing system, said apparatus comprising:
 a video controller that simultaneously outputs digital data of a first video output representing data for display and outputs a second video signal of second video output for display on a terminal associated with the host computing system;
 a frame grabber in electrical communication with a digital output of the video controller, said frame grabber being a piece of hardware capable of collecting sets of data output in digital form from the video controller independent of an analog to digital converter and independent of software, wherein each digital data set represents a frame of data for display;
 a storage device in electrical communication with said frame grabber for storing each of the digital data sets collected by said frame grabber;
 a comparator for comparing a current and a previous digital data set collected by said frame grabber and storing in said storage device a difference data set representing differences between the current and previous digital data set;
 a transmission device for transmitting said data sets to a remote location for display;
 a backup power source for providing power to said apparatus; and logic in electrical communication with said backup power source, wherein said logic applies power from said backup source to said apparatus if other power sources are not available.

32. The apparatus of claim 31, wherein the backup power source comprises a battery pack and wherein the other power sources comprise power from the host computing system and an AC outlet adapter capable of providing power for use by said apparatus if said apparatus does not receive power from the host computing system.

33. An apparatus for transmitting to a remote location information related to a host computing system said apparatus comprising:
 a video controller that simultaneously outputs digital data of a first video output representing data for display and outputs a second video signal of second video output for display on a terminal associated with the host computing system;
 a frame grabber in electrical communication with a digital output of the video controller, said frame grabber capable of collecting sets of data output in digital form from the video controller independent of an analog to digital converter, wherein each digital data set represents a frame of data for display;
 a storage device in electrical communication with said frame grabber for storing each of the digital data sets collected by said frame grabber;
 a comparator for comparing a current and a previous digital data set collected by said frame grabber and storing in said storage device a difference data set representing differences between the current and previous digital data set;
 a transmission device for transmitting said data sets to a remote location for display at a remote maintenance computing system which has at least one storage device;
 a processor in electrical communication with said storage device and said transmission device, wherein said processor at the beginning of a maintenance session, transmits a current data set to a remote location and thereafter transmits difference data sets provided by said comparator representing changes in the data for display; and
 a universal serial bus (USB) interface that emulates the storage device of the remote maintenance computer and that is in electrical communication with said processor and for connection to a USB port of the host computing system, wherein files and information stored in the storage device of the remote maintenance computer can be accessed by the host computing system via said USB interface.

34. An apparatus for transmitting to a remote location information related to a host computing system, said apparatus comprising:
 a video controller that simultaneously outputs digital data of a first video output representing data for display and outputs a second video signal of second video output for display on a terminal associated with the host computing system;
 a frame grabber in electrical communication with the digital first video output of said video controller, said frame grabber capable of collecting sets of data output in digital form from said video controller independent of an analog to digital converter, wherein each digital data set represents a frame of data for display;
 a storage device in electrical communication with said frame grabber for storing each of the digital data sets collected by said frame grabber;

a comparator for comparing a current and a previous digital data set collected by said frame grabber and storing in said storage device a difference data set representing differences between the current and previous digital data set; and a transmission device for transmitting said data sets to a remote location for display in addition to locally viewing a display at the terminal associated with the host computing system.

35. The apparatus of claim 34, further comprising a first card containing the video controller and a second card comprising the frame grabber.

36. The apparatus of claim 34, further comprising a card containing the video controller, the frame grabber, the storage device, the comparator, and the transmission device.

37. The apparatus of claim 34, wherein the first video output comprises a TFT/LCD bus.

38. The apparatus of claim 34, wherein the second video output signal comprises an analog video signal that is output from the second video output.

* * * * *

UNITED STATES PATENT AND TRADEMARK OFFICE
CERTIFICATE OF CORRECTION

PATENT NO. : 6,825,846 B2
DATED : November 30, 2004
INVENTOR(S) : Umasankar Mondal It is certified that error appears in the above-identified patent and that said Letters Patent is hereby corrected as shown below:

Title page,
Item [56], References Cited, OTHER PUBLICATIONS "10/790,160" reference, "aplpicaiton" should read -- application --.

Column 3,
Line 44, "drawback" should read -- drawbacks --.
Line 51, "sell" should read -- well --.

Column 6,
Line 11, "date" should read -- data --.

Column 15,
Line 30, should read:
  7. An apparatus according to claim 1 further comprising a backup power source for providing power to said apparatus.

Column 16,
Line 39, should read:
  21. A System for transmitting to a remote location information related to a computing system, said apparatus comprising:
  a host computing system having a video controller that
    simultaneously outputs digital data of a first video
    output representing data for display and outputs a second
    video signal of a second video output for display on a
    terminal associated with the host computing system;
  a frame grabber in electrical communication with the
    digital first video output of said video controller, said frame
    grabber capable of collecting sets of data output in digital
    form from said video controller independent of an analog to
    digital converter, wherein each digital data set represents a
    frame of data for display;
  a storage device in electrical communication with said frame
    grabber for storing each of the digital data sets collected by
    said frame grabber;
  a comparator for comparing a current and a previous digital data
    set collected by said frame grabber and storing in said storage
    device a difference data set representing differences between the
    current and previous digital data set; and

UNITED STATES PATENT AND TRADEMARK OFFICE
CERTIFICATE OF CORRECTION

PATENT NO. : 6,825,846 B2
DATED : November 30, 2004
INVENTOR(S) : Umasankar Mondal It is certified that error appears in the above-identified patent and that said Letters Patent is hereby corrected as shown below:

<u>Column 16, (cont)</u>
a transmission device for transmitting said data sets to a remote
  location so for display in addition to locally viewing a display at
  the terminal associated with the host computing system.

Signed and Sealed this

Twenty-second Day of March, 2005

JON W. DUDAS
*Director of the United States Patent and Trademark Office*